United States Patent [19]
Shear et al.

[11] 3,916,409
[45] Oct. 28, 1975

[54] TARGET PROCESSING FOR A TIME FREQUENCY COLLISION AVOIDANCE SYSTEM

[75] Inventors: Wayne G. Shear; Daryal Kuntman, both of Pompano Beach, Fla.

[73] Assignee: The Bendix Corporation, Southfield, Mich.

[22] Filed: June 19, 1974

[21] Appl. No.: 480,892

[52] U.S. Cl. .............................................. 343/112 CA;
[51] Int. Cl.² .......................................... G08G 5/04
[58] Field of Search ............................ 343/112 CA

[56] References Cited
UNITED STATES PATENTS

| | | | |
|---|---|---|---|
| 3,458,861 | 7/1969 | Michnik | 343/112 CA |
| 3,714,648 | 1/1973 | Bennett et al. | 343/112 CA X |
| 3,757,339 | 9/1973 | Shear et al. | 343/112 CA |

Primary Examiner—T. H. Tubbesing
Attorney, Agent, or Firm—W. G. Christoforo; Bruce L. Lamb

[57] ABSTRACT

In a time frequency collision avoidance system wherein time is divided into epochs and each epoch is further divided into a predetermined number of time slots, the time of arrival of a range signal after a predetermined time in a time slot is a measure of the range between a local station and a remote station operating in the time slot. The range is measured by strobing a counter, which is set to zero at the beginning of each time slot, by a stable frequency source. Range rate is calculated by memorizing the counter contents and by comparing the memorized contents against counter contents resulting from a range signal received from the same remote station.

21 Claims, 3 Drawing Figures

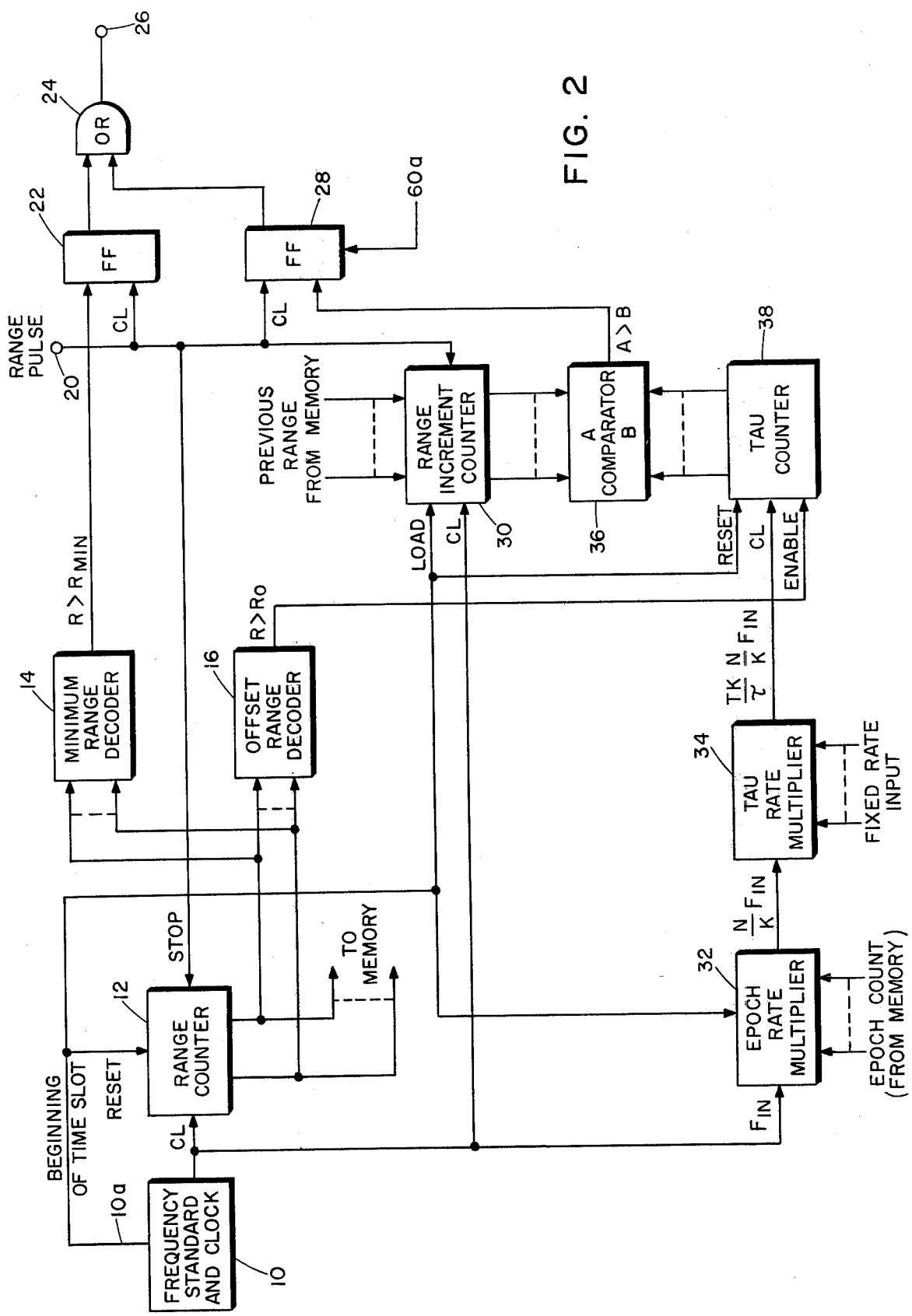

TARGET PROCESSING FOR A TIME FREQUENCY COLLISION AVOIDANCE SYSTEM

BACKGROUND OF THE INVENTION

This invention relates to improvements in the time frequency collision avoidance system and more particularly to an improvement for calculating the range rate or relative velocity between a local station and remote stations operating within the collision avoidance system network.

The time frequency collision avoidance system, sometimes referred to as the Air Transport Association collision avoidance system (ATACAS), has been well described in the literature. As initially defined, the ATACAS operates on a three second cycle, commonly termed an epoch, wherein each epoch is divided into 2001 ½ millisecond time slots. Each aircraft operating within a given CAS network occupies a distinct slot, the assignment of a particular slot to a particular aircraft being made by means known to those skilled in the art and which need not be discussed further here. In this manner, the collision avoidance system can accommodate 2000 cooperating aircraft within the CAS network, that is, operating within ratio line of sight of one another. An aircraft assigned to a particular time slot trnsmits during the time slot a collision avoidance message which is presently constituted to include a 200 microsecond range/doppler pulse at the beginning of the time slot followed by a position coded pulse indicating barometric altitude of the transmitting aircraft. The receipt of the collision avoidance message by a cooperating aircraft provides range and range rate between the receiving and transmitting aircrafts and permits comparison of the receiving aircraft's altitude with the transmitting aircraft's altitude.

All participants in the system maintain an accurate time base alignment, to approximately 1 microsecond, by virtue of sophisticated frequency standards such as a cesium beam atomic clock, or by the periodic resynchronization of an accurate oscillator. Since even atomic clocks must be initially synchronized and resynchronized at a rate dependent upon the quality of the device, the CAS envisions a network of ground synchronization stations. Provisions are also provided to substantially extend the influence of the ground station by passing on clock synchronization from aircraft to aircraft. Means for accomplishing these functions are well known to those skilled in this art.

Since accurate time is available at each participant, range between a local receiving station and a remote transmitting station is simply obtained by comparing the time of arrival of the range pulse transmitted by the remote station with respect to the beginning of the time slot at the local station. The availability of precise synchronized frequency standards, typically parts in $10^8$ minimum, permits the range rate between a remote transmitting station and a local receiving station to be simply obtained at the receiving station by considering the doppler shift of the received range pulse. A doppler measurement, of course, provides instantaneous range rate, but its primary disadvantage is a need for relatively long range pulse (200 microseconds in this case) to provide the required doppler information: There is also the requirement for coherence, that is, the transmitter output at the various participating stations must be directly related to the stable frequency standard by multiplication or phase lock.

On the other hand, a range differencing system wherein the ranges derived from consecutive range signals from a particular remote station are compared with one another to determine range rate, does not require either a long pulse or the aforementioned coherence, with resultant economy in CAS transmitter and receiver implementation. A range differencing system, however, requires an epoch or epoch differentiating computation and association of the various time slots with one another, no small task for equipment operating in a large aircraft population collision avoidance system network.

SUMMARY OF THE INVENTION

The present invention contemplates less complex equipment required by the participants in a collision avoidance system and particularly less complex and costly equipment required by a minimum collision avoidance system user, that is, a CAS participant who for reasons of economy carries only a minimum of CAS equipment which allows him to participate in the system only to a limited extent. For example, a minimum user might be a private civil aircraft having only transmitting capability. The invention addresses itself only to those aspects of the ATACAS dealing with the present range/doppler pulse and in particular teaches a restructuring of the present collision avoidance message to permit the calculating of range rate by range differencing rather than by doppler shift measurement. In accordance with this invention, the range pulse need no longer be coherent and for reasons of time economy, can be significantly shortened from its present 200 microsecond length. Otherwise the exact form of the range pulse is not a part of the invention. As before, the time of arrival of the range pulse in a time slot is a measure of the range of the target occupying that slot, and it is this range that will be used to compute relative velocity by subtracting the range received in successive epochs and dividing by the time between observations. It should be noted that under normal circumstances, a particular target occupies the same time slot during successive epochs, and this fact is used to associate range pulses with a given target. Because of antenna switching, aircraft maneuvers, and signal strength, there is no guarantee of receipt of range pulses every epoch so the interval between range pulses cannot be considered a constant. However, this interval will be equal to a constant times some integer.

Tau Collision Threat Evaluation Criteria

The present invention is an improvement of collision avoidance systems which consider what has come to be known as the tau criteria to determine whether a collision between a local aircraft or station with an intruder, target or remote station is imminent. The theory behind tau criteria is as follows. If unaccelerated flight is assumed, then constant relative bearing and constant relative velocity between the local and remote stations are recognized as valid criteria for determining that a collision is imminent. It has been shown, however, that at ranges required for successful evasive maneuvers to avoid collision, the measurements of the angles or velocities required are not accurate enough to properly determine whether a collision is indeed imminent and that for the proper protection of aircraft a relatively large number of false alarms must be accepted. A false alarm is defined as an indication by the collision avoidance system that a collision is imminent, when in fact no collision is imminent. Of course, any collision avoidance system must provide an indication to the pilot or automatically initiate action some minimum time before a collision would otherwise occur to permit the aircraft to be maneuvered a safe distance from a point of impending collision. This minimum or escape time together with its related distance from the point of impending collision must be sufficient to accommodate any system errors, and in addition must include pilot reaction time and aircraft response time. A typical escape time is presently on the order of 30 seconds.

Recognizing a need for a minimum escape time, collision threat may be evaluated on the basis of tau criteria, where tau is equal to range divided by range rate, a quantity having the dimension of time. For real time to time of closest approach (T) in a collision case, tau approximates T for large values of T. The tau criteria, using the more readily measured parameters of range and range rate (as opposed to relative bearing angle or rate of change of velocity) provides a feasible basis for collision avoidance system implementation according to the present invention.

With the threat of evaluation circuitry the present invention comprises two basic elements: a tau computer to perform the threat dalculations, and a memory section to store the range information in association with slot numbers for cooperating aircraft in the collision avoidance network.

Based on the tau criteria described above, the tau computer determines that a remote aircraft is a collision threat if its closure rate with respect to the local aircraft meets the following criteria:

$$\text{Range rate} > \frac{R - R_o}{\tau} \qquad (1)$$

where
R = Range of remote aircraft
$R_0$ = Offset Range
$\tau$ = Time constant for tau criteria.

Offset range is a projection of the linear tau function which provides a buffer for collision encounters involving accelerations such as turning encounters. The tau computer also considers the remote aircraft a collision threat if its range is less than a predetermined minimum range ($R_{MIN}$).

The range rate information is derived from successive range measurements by dividing the range difference over successive measurements by the elapsed time between the measurements. Since the collision avoidance system utilizes a fixed epoch and each aircraft transmits during its own time slot, the time interval between successive range measurements is an integral multiple of the epoch interval. By substituting range and time increments for the range rate, equation 1 can be written as:

$$\frac{\Delta R}{NT} > \frac{R - R_o}{\tau} \qquad (2)$$

where
$\Delta R$ = Range difference between successive range measurements

N = Number of epochs between range measurements
T = Epoch period.

Equation 2 can be rewritten as:

$$\Delta R > \frac{R - R_o}{\tau} NT \qquad (3)$$

$$\Delta R > (R - R_o) \frac{Tk}{\tau} \frac{N}{k} \qquad (4)$$

where $k$ is a fixed constant. If equation 4 is satisfied then a collision threat is present with respect to the intruder in the particular time slot. The tau criteria is expressed in the form of equation 4 to aid in the explanation of the tau computer to be made later.

Range between the local aircraft and a remote aircraft operating in a particular time slot is computed by a digital counter which is strobed from an accurate source of clock pulses, the counter being set to an initial or zero state at the beginning of the time slot and being stopped by the receipt of the range pulse at the local station during the time slot. The counter now contains a digital number which is related to range which is stored in an orderly manner in the memory. During the identical time slot in a subsequent epoch another range determination is made in the counter and compared against the range as contained in the memory to determine range rate. If no range pulse is received at the local aircraft during the next epoch note of this fact is entered into the memory. This note provides the basis for determining the value of N in equation 2. If after a successful range measurement is made, a predetermined number of successive epochs occur without a successful range determination being made in the same time slot, the range determination previously stored is removed as invalid.

Accordingly it is an object of this invention to provide an improved target processing means for a time frequency collision avoidance system.

It is another object of this invention to provide means for computing both range rate and tau in one continuous operation with a minimum of circuitry for use in a time ordered collision avoidance system.

A further object of the invention is to provide means in a collision avoidance system for computing range rate.

Another object of this invention is to provide the means as described above implemented in a digital form.

These and other objects of the invention will be made apparent from a reading and understanding of the teachings herein.

BRIEF DESCRIPTION OF THE DRAWINGS

FIG. 2 is a block diagram of the collision threat evaluation section of a collision avoidance system.

DESCRIPTION OF THE PREFERRED EMBODIMENT

Figure 1:
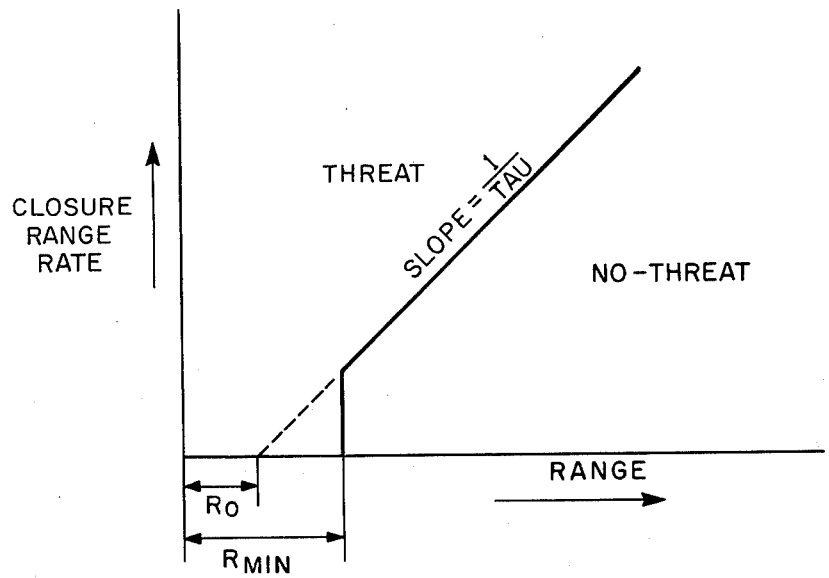
FIG. 1 is a typical tau criteria graph which is helpful in explaining the purposes of the invention.

Refer to FIG. 1 where a curve having generally the slope of $1/\tau$, where $\tau$ is equal to tau, is plotted against range and range rate. The curve, if extended, intercepts the range axis offset from the origin by $R_0$, the range offset. As previously explained, range offset provides a buffer zone about the local aircraft for collision encounters involving acceleration, such as turning maneuvers. In addition, the $1\tau$ curve breaks to become parallel to the range axis and displaced $R_{MIN}$ therefrom. It will be remembered that intruders within minimum range $R_{MIN}$ are considered a collision threat regardless of any other factor. Generally aircraft whose range/range rate parameters with respect to the local aircraft and lying to the left of the curve are considered collision threats, whilel those whose parameters lie to the right of the curve are not considered collision threats.

Refer now to FIG. 2 where there is seen a frequency standard and clock 10 and a range counter 12, elements found in the present ATA collision avoidance system which operates to compute range rate from the range pulse doppler shift. Briefly, the frequency standard is a stable frequency source such as an atomic clock or accurate crystal source synchronized with frequency standards or cooperating elements in the collision avoidance network. The frequency standard operates a clock, suitably a digital clock, which is also synchronized with similar clocks on cooperating elements or aircraft in the network. Range counter 12 is suitably a binary counter which counts the clock pulses from the frequency standard. As is known to those skilled in the art the range counter is set to an initial state at the beginning of the time slot and thereafter counts the pulses applied thereto until a range pulse is received from a remote station, at which time the range counter is stopped or sampled, the count at that time being directly proportional to the range between the local and remote stations. While the specific repetition frequency of the signal used to strobe range counter 12, nor the number of stages of the counter, is not vital to the understanding of the operation of this invention, a reasonable embodiment of the invention sugests that the error contribution in the derivation of range rate as a result of the quantization of these parameters be in keeping with other system accuracies. In the present embodiment a repetition frequency of 10 megahertz and a 12 stage range counter are assumed. With these parameters the range counter will provide over 60 nautical miles range measurement capability with approximately 100 ft. resolution. Clock 10 also generates signals which identify certain specific points in each time slot. For example, a signal identifying the beginning of each time slot is generated on line 10a.

In addition, the known collision avoidance equipment also includes a receiver for receiving collision avoidance messages from remote or intruder aircraft. The receiver includes decoder means for recognizing the range pulse in the received collision avoidance message and a signal identifying the leading edge of the range pulse is generated at terminal 20.

The minimum range decoder 14 is basically a comparator having a preset digital number therein corresponding to a predetermined minimum range. The decoder compares the preset digital number against the contents of range counter 12 and generates a logic 1 output which is applied to the set input terminal of flip flop 22, so long as the range corresponding to the number in range counter 12 is less than the range corresponding to the preset number in the decoder. As soon as the range indicated by counter 12 exceeds the predetermined range, the decoder output goes to logic 0. Terminal 20 is connected to the toggle terminal of flip flop 22; thus, upon receipt of the range pulse at terminal 20 flip flop 22 is toggled. If there is at that time a logic 1 input in its set terminal it generates an output signal which is applied through OR gate 24 to terminal 26, indicating that an intruder aircraft is within the predetermined minimum range from the local station. If, however, there is at that time a logic 0 at the set input terminal the flip flop generates no output signal.

A range increment counter 30 is preferably a binary counter which, in response to the signal at the beginning of each time slot on line 10a, loads the previous range for that particular time slot from the memory to be shown below. Thereafter counter 30 is counted down by the same clock pulses which are applied to range counter 12 until the leading edge of the range pulse is received and applied at terminal 20. At that time the counter is disabled and its digital content is then directly proportional to the range increment between the previous range as recorded in the memory for that time slot and the present range. This number proportional to the range increment is transferred to comparator 36. If, on the other hand, counter 30 reaches 0 before the leading edge of the range pulse is received, the counter is disabled. Such a case indicates that the intruding aircraft is moving away from the local station and no threat calculation with be necessary.

An epoch rate multiplier 32 is a device such as a counter having an output frequency which is equal to its input frequency multiplied by the digital rate input N and divided by $2^M$, where M is the number of states of the rate multiplier counter provided that N is less than $2^M$. If N is greater than $2^M$ then the time since the last valid range measurement to an intruder occupying the particular time slot is too long and a resulting threat evaluation will be invalid, thus, no computation is made in the latter case. At the beginning of each time slot, N, the number of epochs elapsed since the last range measurement for the aircraft occupying a particular time slot is recalled from the memory, in a manner to be described below, and used as the rate input for the epoch rate multiplier 32. The input frequency of the rate multiplier is a clock frequency which is also applied to range counter 12, while the output frequency of multiplier 32 is equal to N divided by $k$ times the input frequency, in accordance with equation 4 as discussed earlier.

The tau rate multiplier 34 is another device having a fixed rate input selected such that the ratio of the output frequency to the input frequency is equal to T times $k$ divided by $\tau$, as previously described with respect to equation 4.

An offset range decoder 16 is a device somewhat similar to the minimum range decoder 14 and includes a preset digital number corresponding to the offset range $R_o$ and continuously searches the contents of the range counter 12. When decoder 16 detects that the number in range counter 12 corresponds to a range in excess of the offset range it generates an output which enables tau countere 38. The tau counter is suitably a digital counting device which is reset to an initial value, such as 0, at the beginning of each time slot and is enabled only by the output of the offset range decoder 16 indicating that the range exceeds the offset range, to thus permit counter 38 to accumulate the clock pulses from tau rate multiplier 34.

Summarizing the operation of the system shown in FIG. 2 to provide a tau calculation, at the beginning of each time slot the intruder range information of an aircraft transmitting in a particular time slot is recalled from the memory. If N (number of epochs since the last range measurement) from the memory is less than $2^M$, the range information in the memory is considered valid and loaded into the range increment counter 30. N is recalled from the memory and used as a rate input for the epoch rate multiplier 32. The range counter 12 and tau counter 38 are set to 0. Counter 12 immediately starts counting the clock frequency applied thereto but tau counter 38 is enabled only after the offset range counter 16 indicates that the offset range has been exceeded. Tau counter 38 thus calculates equation 4. As can be seen, the contents of tau counter 38 is continuously compared against the contents of range increment counter 30 in comparator 36, the contents of counter 30 being termed the A input and the contents of counter 38 being termed the B input. If the A input exceeds the B input comparator 36 generates a logic 1 output. The comparator output signal is applied to the set input terminal of flip flop 28 whose toggle terminal is clocked by the leading edge of the range pulse at terminal 20. Thus, if the output of comparator 36 is a logic 1 indicating that the A input is greater than the B input at the time the leading edge of the range pulse is received flip flop 28 generates an output signal which is applied through OR gate 24 to terminal 26. A signal at terminal 26 indicates that a collision is imminent and can be used by the collision avoidance system by means which are well known to those skilled in the art to provide an indication to the pilot of the imminence of such collision so that evasive maneuvers can be made.

Figure 3:
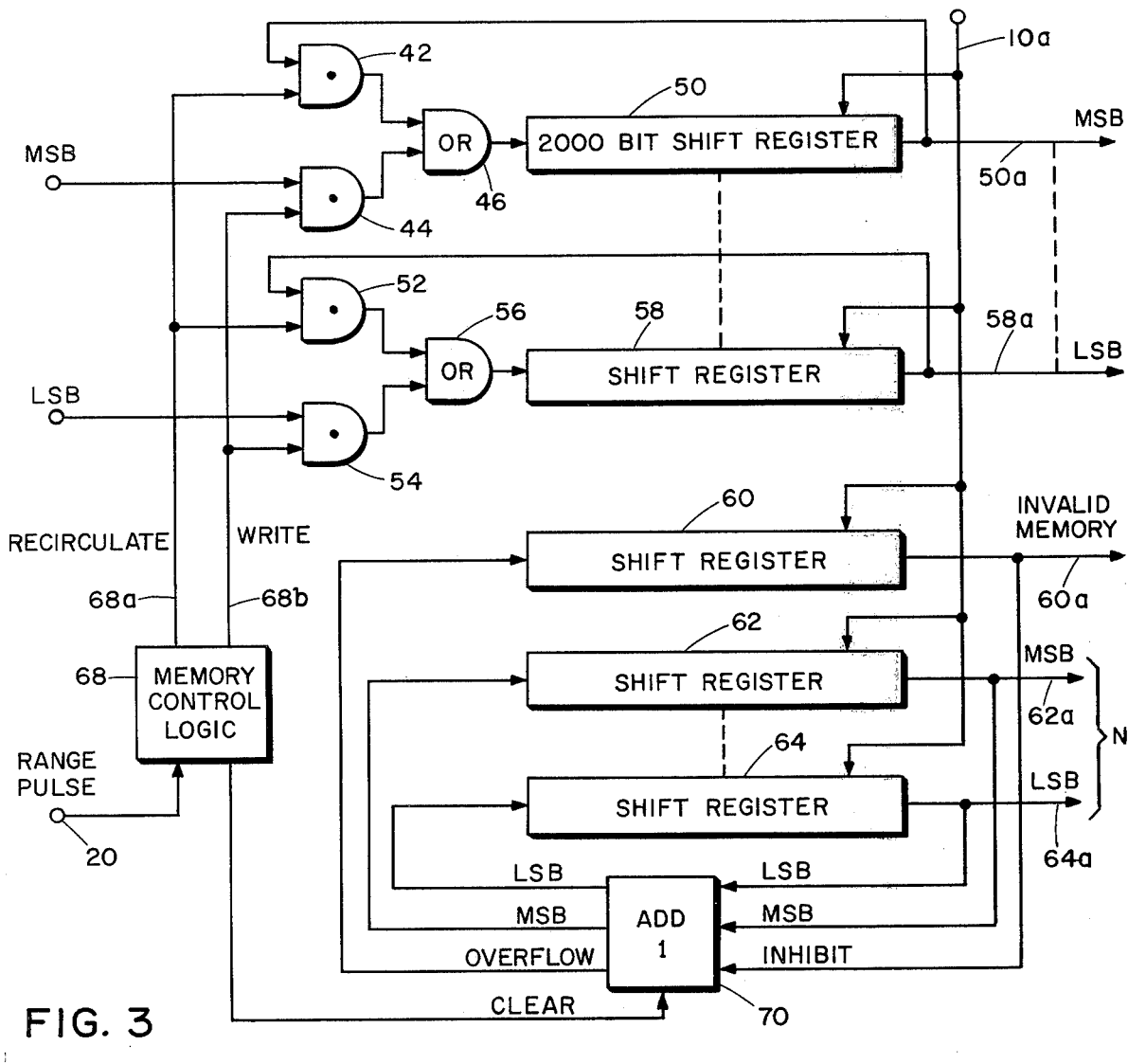
FIG. 3 is a block diagram of the memory section used in the present invention.

Refer now to FIG. 3 which shows the memory means for storing the various range measurements for each cooperating remote aircraft within the collision avoidance network. The means for storing the range measurements is comprised of a plurality of shift registers which include shift registers 50 and 58, corresponding to storage of the most significant bit and the least significant bit of each range word, other shift registers being implied, as required, by the dotted line connecting the two shown shift registers. The number of shift registers required for storing the range measurements will be equal to the number of stages or bits of range counter 12 of FIG. 2. In this particular embodiment, thus, 12 shift registers similar to and including registers 50 and 58 will be required. In addition, each of the shift registers, in order to store all the range information contained in the 2000 time slots of each epoch, requires a capacity for storing 2000 bits each. Thus, each shift register is suitably comprised of 2000 stages. In this particular embodiment the shift registers are arranged in circulating memories each essentially identical to those shown, wherein shift register 50 has its output terminal connected as an input to AND gate 42 whose output is applied to OR gate 46 to the input of the shift register. In addition, each shift register is clocked at the beginning of each time slot by the signals on line 10a, which line was previously seen in FIG. 2, so that if gate 42 is qualified by means to be described below, the information in the shift register is recirculated therein. Each circulating memory includes a second AND gate 44 which is arranged to be closed when gate 42 is qualified and is qualified when gate 42 is closed. Gate 44 receives as one input the most significant bit information from range counter 12 of FIG. 2. Thus, when gate 42 is closed and gate 44 is opened shift register 50 is updated with the most significant bit information of the instantaneous range word contained in range counter 12 of FIG. 2 by passing through gate 44 and gate 46 into register 50 in response to the signal on line 10a. Since the contents of counter 12 are loaded into the memory section at the beginning of a time slot and in addition counter 12 is reset at the beginning of the time slot it is necessary that counter 12 be arranged to unload its information before it is reset. This can be simply done by one skilled in the art by providing a slight counter reset delay.

In like manner shift register 58 is arranged in a circulating memory together with AND gates 52 and 54 and OR gate 56. Since this shift register is used for storing the least significant bits of the range data, the least significant bit of range counter 12 is connected into the shift register through gates 54 and 56 and entered therein. At the same time the other bits in the range word of counter 12 are entered into the other shift registers, not shown but implied by the dashed line connecting registers 50 and 58.

Since there is no guarantee that a range pulse will be received in a particular time slot each epoch, means of storing information to determine the time interval between range measurements is needed. This storage means is provided by shift registers 60, 62 and 64 together with adder 70. Basically, the time information is obtained by counting the number of epochs between the range measurements. Upon receipt of a range pulse, indicating that a range measurement has been made in a particular time slot, a signal is impressed at terminal 20, also seen in FIG. 2, at the leading edge of the range pulse. This signal is applied to memory control logic 68 which thus applies a clear signal to adder 70. In this particular embodiment it is assumed that N, the number of epochs occurring between range measurements, is allowed to be a maximum of 4, thereafter the memory contents for the particular time slot are considered invalid. Accordingly, two shift registers 62 and 64 are used for accumulating N. If a number greater than 4 is desired it should be obvious to one skilled in the art how to provide additional storage with further shift registers. Shift registers 60, 62 and 64 are also strobed at the beginning of each time slot by the signal on line 10a with the information of the various shift registers being recirculated back into the input of the shift registers through adder 70. The output of shift registers 62 and 64 comprises the input to epoch rate multiplier 32 of FIG. 2.

As aforementioned, if a range pulse is received in a particular time slot, memory control logic 68 applies a signal to adder 70 which thus generates logic 0 outputs which are applied to the inputs of registers 60, 62 and 64. If, however, no range pulse is received for this particular time slot, adder 70 adds a 1 to the binary word circulating therethrough. It can thus be seen that if four epochs occur without receipt of a range pulse in a particular time slot adder 70 will overflow to enter a logic 1 into shift register 60, indicating that range memorized in that particular time slot is invalid. In addition, the receipt of a range pulse causes memory control logic to generate an output on line 68b and to extinguish an output on line 68a which action qualifies gates 44 and 54 and similar unshown gates so that the range can be entered into the memory. If, on the other hand, no range pulse is received in a given time slot then line 68a remains energized so that gates 42, 52 and similar unshown gates are qualified and the previous stored range word is recirculated in the memory.

It should now be obvious that at the beginning of a time slot there is available at the range memory output lines, that is, on lines 50a, 58a and similar unshown lines, a binary word corresponding to the last range measured to the intruder occupying the particular time slot. There is also present at lines 62a and 64a a binary word which indicates the number of epochs (N) which have occurred since the last range measurement to this intruder was made. In addition, there is a binary signal comprised of a single bit on line 60a which indicates whether the time since the last range measurement to this intruder exceeds a predetermined maximum, in which case the memorized range is considered invalid. The binary signals are applied to various elements of FIG. 2, and in particular, the memorized range word is applied to range increment counter 30 and the number N is applied to epoch rate multiplier 32, as previously described. In addition, line 60a, which contains an indication of whether a valid memorized range is present, is connected into the circuit of FIG. 2 to prevent a tau collision determination from being made if the memorized range is invalid. Suitably, line 60a is connected to flip flop 28 to prevent that flip flop from generating an output for that time slot if an invalid memorized range is present.

Having shown this preferred embodiment of our invention, we now claim as our property the subject matter embraced by the true scope and spirit of the appended claims.

The invention claimed is:

1. In a time frequency collision avoidance system for a plurality of units wherein time is divided into epochs and each epoch is further divided into a predetermined number of time slots wherein each unit operating within the system is associated with a particular time slot and includes means for generating a binary range word of a predetermined number of parallel bits related to the range between the local unit and a remote unit associated with the instantaneously occurring time slot, means for calculating the range rate between the local unit and the remote unit comprising:

a source of clock signals which occur at a predetermined point in each time slot;

a plurality of binary circulating memories, each including an output terminal and an input terminal, the number of said circulating memories being equal to the number of bits of said binary word, each said memory being associated with a predetermined bit position of said binary word, each said memory including gate means effective when in a first state for connecting the output terminal of said memory with the input terminal of said memory, and effective when in a second state for disconnecting said output terminal from said input terminal and for connecting a binary signal comprised of a single bit applied thereto to said input terminal;

means for applying the bits of said binary word to the gate means of its associated memory, said memories being responsive to said clock signals for entering binary information at the input terminal into said memories and for stepping the binary information through said memories in an orderly fashion, one step during each time slot, the bit storage capacity of a memory being equal to the number of time slots in an epoch;

means responsive to the generation of a range word in a particular time slot for triggering the gate means to said second state whereby the generated range word is entered into said memory, said gate means being normally in said first state; and, means for comparing the range word generated during each time slot with the binary word simultaneously appearing at the output terminals of said memories, the results of said comparison comprising said range rate.

2. The means for calculating of claim 1 wherein each unit transmits a range signal at a predetermined point in its assigned time slot, the time of arrival of said range signal at a local unit being a measure of the range between the local unit and the transmitting unit, the local unit including a source of second clock signals and a first counter for counting said second clock signals and set to an initial count at a predetermined point in each time slot, the contents of said counter at the time of arrival of said range signal at the local unit being thereby related to the binary range word, said means for comparing comprising a second counter counted down by said second clock signals and including means for entering therein a binary number related to the binary word appearing at the output terminals of said memories when the first counter is set to said initial count, the count of said second counter at the time of arrival of the range signal at the local unit being related to the range rate.

3. The means of claim 2 wherein the local unit includes means for generating a range pulse upon arrival at that unit of a range signal transmitted from a remote unit, and additionally comprising:

means for memorizing with respect to each time slot the number of epochs which have occurred since the last range pulse generated in that time slot;

an offset range decoder sensing the count in said first counter for generating an enable signal when the count in said first counter corresponds to a range in excess of a predetermined minimum range;

means cyclically effective in each time slot for multiplying the repetition frequency of said second clock signals by a factor which includes at least the memorized number of epochs which have occurred since the last range pulse generated in that time slot;

a third counter set to a predetermined initial value in each time slot and enabled to count in accordance with the multiplied repetition frequency by said enable signal; and, means comparing the counts contained in said second and third counters and responsive to said range pulse for generating an output signal if the counts contained in said second and third counters are within a predetermined relationship with respect to one another when said range pulse is generated, said output signal being an indication of a collision threat between the local unit and the remote unit occupying the time slot.

4. The means of claim 3 with additionally a minimum range decoder responsive to said range pulse and the contents of said first counter for generating said output signal if the contents of said first counter represents a range less than a predetermined minimum range at the time a range pulse is generated.

5. The means of claim 3 wherein said means for memorizing the number of epochs comprises:
- at least one further circulating memory having an output terminal and an input terminal;
- adder means connecting said at least one further circulating memory output terminals to said input terminals for adding a 1 to the information passing therethrough when in a first condition and for returning the information passing therethrough to an initial state when in a second condition, whereby the information recirculated from an output terminal to an input terminal is either incremented by 1 or returned to an initial state, and including an overflow output line on which a bit of a predetermined polarity appears if the addition of 1 to the information passing therethrough causes an overflow;
- means responsive to the generation of a range pulse for triggering said adder means into said second condition during a particular time slot in which the range pulse is generated, said adder means being normally in said first condition;
- another circulating memory having an output terminal and an input terminal connected to said overflow output line, the bit capacity of each of said at least one further circulating memory and said another circulating memory being equal to the number of time slots in an epoch;
- means for stepping said at least one further circulating memory and said another circulating memory synchronously with said plurality of circulating memories, the information circulating in said at least one further circulating memory being related to the number of epochs which have occurred since the last range pulse generated in a particular time slot, and the information at the output terminal of said at least one further circulating memory being related to the number of epochs which have occurred since the last range pulse generated in the instant time slot; and, means for connecting the output terminal of said another circulating memory to inhibit generation of an output signal by said means comparing.

6. The means of claim 5 with additionally a minimum range decoder responsive to said range pulse and the contents of said first counter for generating said output signal when the contents of said first counter represents a range less than a predetermined minimum range at the time that a range pulse is generated.

7. A time frequency collision avoidance system for a plurality of spaced apart airborne units wherein time is divided into epochs and each epoch is further divided into a predetermined number of time slots with each unit associated with a generally unique time slot and the unit associated with a time slot transmits at a predetermined time in its time slot a range message, the time of arrival of said range message at a local unit being related to the range between the local unit and the remote transmitting unit, said local unit including means for generating a range pulse whose time of generation is related to the time of arrival of said range message at said local unit, the cooperating units operating within the collision avoidance having time closely synchronized with at least system time, a local unit within said system comprising:
- a clock closely synchronized with at least system time for generating a first signal at a predetermined point in each time slot and a train of clock pulses;
- a range counter for accumulating said clock pulses and set to an initial value by said first signal, the number contained in said range counter upon generation of said range pulse being related to the range between said local unit and the transmitting unit;
- an offset range decoder examining the number contained in said range counter for generating an enable signal whenever the number contained in said range counter is related to a range in excess of a predetermined offset range;
- first means responsive to said first signals for memorizing a number related to the number contained in said range counter upon generation of said range pulse including means for recalling a number previously stored for the same time slot in a previous epoch;
- second means responsive to said first signals for memorizing an epoch number related to whether or not a range pulse is generated in a particular time slot and for altering the epoch number previously memorized in accordance with whether or not a range pulse is generated in the same time slot of each subsequent epoch, the epoch numbers thereby memorized being related to the number of consecutive epochs which have occurred since the last time a range pulse was generated in a particular time slot, said second means being additionally responsive to said first signals for recalling an epoch number previously memorized for the same time slot in the previous epoch;
- means for altering the repetition frequency of said clock pulses in accordance with a factor which includes a signal related to the number recalled from said first means and a constant signal;
- a second counter set to an initial count by said first signal and enabled by said enable signal to respond to the altered pulse repetition frequency of said clock pulses;
- a range increment counter responsive to said first signal to set therein a number related to the number recalled from said first means and then responsive to said clock pulses for altering the number previously set therein; and,
- means responsive to said range pulse for comparing the contents of said second counter with the contents of said range increment counter at the time said range pulse is generated and for generating an output signal if the results of the comparison satisfy predetermined criteria, said output signal being an indication that a collision threat exists between the local unit and the unit transmitting in the instant time slot.

8. The collision avoidance system of claim 7 with additionally a minimum range decoder examining the number contained in said range counter for generating said output signal whenever the number contained in said range counter is related to a range less than a predetermined minimum range at the time said range pulse is generated.

9. The collision avoidance system of claim 8 wherein said constant signal is at least related to tau.

10. The collision avoidance system of claim 9 wherein said range counter has a capacity of M binary bits, said first means comprising a bank of M circulating memories stepped by said first signals, each of said circulating memories having a bit storage capacity equal to the number of time slots in an epoch and having an input terminal and an output terminal connected through a gate means, said gate means when in a first state permitting the information on said output terminal to be recirculated into said input terminal and when in a second state blocking the recirculation of information from said output to said input terminal and connecting a corresponding bit position of said range counter into said input terminal, the bits at the output terminals of said M circulating memories comprising the number recalled from said first means; and, means responsive to the generation of a range pulse for triggering said gate means into said second state during at least a portion of the time slot in which the range pulse is generated and responsive to the non-generation of a range pulse for holding said gate means in said first state during at least a portion of the time slot in which a range pulse is not generated.

11. The collision avoidance system of claim 8 wherein said range counter has a capacity of M binary bits, said first means comprising a bank of M circulating memories stepped by said first signals, each of said circulating memories having a bit storage capacity equal to the number of time slots in an epoch and having an input terminal and an output terminal connected through a gate means, said gate means when in a first state permitting the information on said output terminal to be recirculated into said input terminal and when in a second state blocking the recirculation of information from said output to said input terminal and connecting a corresponding bit position of said range counter into said input terminal, the bits at the output terminals of said M circulating memories comprising the number recalled from said first means; and, means responsive to the generation of a range pulse for triggering said gate means into said second state during at least a portion of the time slot in which the range pulse is generated and responsive to the non-generation of a range pulse for holding said gate means in said first state during at least a portion of the time slot in which a range pulse is not generated.

12. The collision avoidance system of claim 11 with third means responsive to said first signals for memorizing a binary indication of whether or not said second means has overflowed and for recalling a binary indication previously memorized for the same time slot in a subsequent epoch; and,
  means responsive to a recalled binary indication that the second means overflowed for inhibiting the generation of an output signal by said means for comparing.

13. The collision avoidance system of claim 12 wherein said constant signal is at least related to tau.

14. The collision avoidance system of claim 8 with third means responsive to said first signals for memorizing a binary indication of whether or not said second means has overflowed and for recalling a binary indication previously memorized for the same time slot in a subsequent epoch; and,
  means responsive to a recalled binary indication that the second means overflowed for inhibiting the generation of an output signal by said means for comparing.

15. The collision avoidance system of claim 7 wherein said constant signal is at least related to tau.

16. The collision avoidance system of claim 15 wherein said range counter has a capacity of M binary bits, said first means comprising a bank of M circulating memories stepped by said first signals, each of said circulating memories having a bit storage capacity equal to the number of time slots in an epoch and having an input terminal and an output terminal connected through a gate means, said gate means when in a first state permitting the information on said output terminal to be recirculated into said input terminal and when in a second state blocking the recirculation of information from said output to said input terminal and connecting a corresponding bit position of said range counter into said input terminal, the bits at the output terminals of said M circulating memories comprising the number recalled from said first means; and, means responsive to the generation of a range pulse for triggering said gate means into said second state during at least a portion of the time slot in which the range pulse is generated and responsive to the non-generation of a range pulse for holding said gate means in said first state during at least a portion of the time slot in which a range pulse is not generated.

17. The collision avoidance system of claim 16 with third means responsive to said first signals for memorizing a binary indication of whether or not said second means has overflowed and for recalling a binary indication previously memorized for the same time slot in a subsequent epoch; and,
  means responsive to a recalled binary indication that the second means overflowed for inhibiting the generation of an output signal by said means for comparing.

18. The collision avoidance system of claim 15 with third means responsive to said first signals for memorizing a binary indication of whether or not said second means has overflowed and for recalling a binary indication previously memorized for the same time slot in a subsequent epoch; and,
  means responsive to a recalled binary indication that the second means overflowed for inhibiting the generation of an output signal by said means for comparing.

19. The collision avoidance system of claim 7 wherein said range counter has a capacity of M binary bits, said first means comprising a bank of M circulating memories stepped by said first signals, each of said circulating memories having a bit storage capacity equal to the number of time slots in an epoch and having an input terminal and an output terminal connected through a gate means, said gate means when in a first state permitting the information on said output terminal to be recirculated into said input terminal and when in a second state blocking the recirculation of information from said output to said input terminal and connecting a corresponding bit position of said range counter into said input terminal, the bits at the output terminals of said M circulating memories comprising the number recalled from said first means; and, means responsive to the generation of a range pulse for triggering said gate means into said second state during at least a portion of the time slot in which the range pulse is generated and responsive to the non-generation of a range pulse for holding said gate means in said first state during at least a portion of the time slot in which a range pulse is not generated.

20. The collision avoidance system of claim 19 with third means responsive to said first signals for memorizing a binary indication of whether or not said second means has overflowed and for recalling a binary indication previously memorized for the same time slot in a subsequent epoch; and,
    means responsive to a recalled binary indication that the second means overflowed for inhibiting the generation of an output signal by said means for comparing.

21. The collision avoidance system of claim 7 with third means responsive to said first signals for memorizing a binary indication of whether or not said second means has overflowed and for recalling a binary indication previously memorized for the same time slot in a subsequent epoch; and,
    means responsive to a recalled binary indication that the second means overflowed for inhibiting the generation of an output signal by said means for comparing.

* * * * *